US012705609B2

(12) United States Patent
Prokop et al.

(10) Patent No.: US 12,705,609 B2
(45) Date of Patent: Aug. 11, 2026

(54) SYSTEM, METHOD, AND COMPUTER PROGRAM PRODUCT FOR SECURE DATA DISTRIBUTION

(71) Applicant: Visa International Service Association, San Francisco, CA (US)

(72) Inventors: Bartlomiej Piotr Prokop, Belfast (GB); Bryan Carroll, Livermore, CA (US); Rhidian Desmond Thomas John, Helen's Bay (GB); Julie Nicholl, Bangor (GB)

(73) Assignee: Visa International Service Association, San Francisco, CA (US)

( * ) Notice: Subject to any disclaimer, the term of this patent is extended or adjusted under 35 U.S.C. 154(b) by 1 day.

(21) Appl. No.: 18/838,762

(22) PCT Filed: Feb. 15, 2022

(86) PCT No.: PCT/US2022/016394
§ 371 (c)(1),
(2) Date: Aug. 15, 2024

(87) PCT Pub. No.: WO2023/158420
PCT Pub. Date: Aug. 24, 2023

(65) Prior Publication Data
US 2025/0182104 A1 Jun. 5, 2025

(51) Int. Cl.
*G06Q 20/38* (2012.01)
*G06Q 20/40* (2012.01)
*H04L 9/14* (2006.01)

(52) U.S. Cl.
CPC ....... *G06Q 20/3829* (2013.01); *G06Q 20/401* (2013.01); *H04L 9/14* (2013.01)

(58) Field of Classification Search
CPC ..... H04L 9/14; G06Q 20/401; H06Q 20/3829
USPC ..................................................................... 726/2
See application file for complete search history.

(56) References Cited

U.S. PATENT DOCUMENTS

| | | | |
|---|---|---|---|
| 10,454,686 B2 * | 10/2019 | Mildh | H04W 8/08 |
| 10,909,544 B1 * | 2/2021 | Osborn | G06Q 20/3278 |
| 2004/0073792 A1 | 4/2004 | Noble et al. | |
| 2008/0065892 A1 | 3/2008 | Bailey et al. | |
| 2014/0108263 A1 * | 4/2014 | Ortiz | G06Q 20/3829 705/44 |
| 2016/0182231 A1 | 6/2016 | Fontecchio | |
| 2018/0019879 A1 | 1/2018 | Kravitz et al. | |
| 2018/0189753 A1 * | 7/2018 | Konda | H04L 9/14 |
| 2018/0205545 A1 | 7/2018 | Savolainen et al. | |

(Continued)

*Primary Examiner* — Teshome Hailu
(74) *Attorney, Agent, or Firm* — The Webb Law Firm

(57) ABSTRACT

A method, system, and computer program product is provided for secure data distribution. The system includes at least one processor programmed or configured to receive, from a first system, a data capture request, generate a data capture object including a plurality of orchestration rules and a first public key, digitally sign the data capture object with a second private key corresponding to a second public key, transmit the data capture object to the first system, receive encrypted user data including user data encrypted with the first public key, generate a transient token based on the user data and the plurality of orchestration rules, and distribute the transient token to each party of the plurality of parties by transmitting the transient token to the first system via a device.

20 Claims, 4 Drawing Sheets

(56) References Cited

U.S. PATENT DOCUMENTS

2020/0380503 A1* 12/2020 Prokop .................. G06Q 20/12
2021/0019716 A1 1/2021 Prokop et al.
2021/0049590 A1* 2/2021 Gaddam ............. H04L 63/0853

* cited by examiner

SYSTEM, METHOD, AND COMPUTER PROGRAM PRODUCT FOR SECURE DATA DISTRIBUTION

CROSS-REFERENCE TO RELATED APPLICATION

This application is the United States national phase of International Patent Application No. PCT/US22/16394 filed Feb. 15, 2022, the disclosure of which is hereby incorporated by reference in its entirety.

BACKGROUND

1. Technical Field

This disclosure relates generally to secure data distribution and, in non-limiting embodiments or aspects, systems, methods, and computer program products for securely distributing data among a plurality of systems.

2. Technical Considerations

Existing electronic payment processes may involve multiple parties/systems, such as account holders, merchants, payment processors, checkout providers, and various service providers. However, these systems do not need access to all of the information that is created and communicated during a payment transaction to fulfill their respective roles in processing the transaction. Exposing these parties to data unnecessary to their roles can lead to security concerns and creates additional access points for intruders to hack. Moreover, by passing a payment message to multiple parties, it is difficult to track the state of the message and/or the transaction due to technical issues of replication and data integrity.

SUMMARY

According to non-limiting embodiments or aspects, provided is a computer-implemented method, comprising: receiving, by at least one processor from a first system, a data capture request comprising a plurality of keys and identifying a device in communication with the first system, the plurality of keys comprising a key for each party of a plurality of parties; generating, with the at least one processor, a data capture object comprising a plurality of orchestration rules and a first public key, the first public key corresponding to a first private key; digitally signing, with the at least one processor, the data capture object with a second private key corresponding to a second public key; transmitting, with the at least one processor, the data capture object to the first system; receiving encrypted user data comprising user data encrypted with the first public key, at least a portion of the user data input from a device; generating, with the at least one processor, a transient token based on the user data and the plurality of orchestration rules; and distributing, with the at least one processor, the transient token to each party of the plurality of parties by transmitting the transient token to the first system via the device, the transient token configured to, based on the plurality of orchestration rules, cause the first system to transmit the transient token to each party of the plurality of parties based on a corresponding key of the plurality of keys.

In non-limiting embodiments or aspects, the first system comprises a merchant system webpage, and the user data is input into a frame or window on the merchant system webpage hosted by a system external to the merchant system webpage. In non-limiting embodiments or aspects, transmitting the transient token to the first system via the device comprises passing the transient token from the device to the first system via a web browser executing on the device. In non-limiting embodiments or aspects, a payment gateway comprises the at least one processor. In non-limiting embodiments or aspects, the data capture request is received via an Application Programming Interface (API). In non-limiting embodiments or aspects, the first system comprises a merchant system, and the plurality of parties comprises a payment processor, the merchant system, and at least one of the following: a fraud service system, a loyalty provider system, an issuer system, an authentication service provider system, or any combination thereof.

According to non-limiting embodiments or aspects, provided is a system comprising at least one processor programmed or configured to: receive, from a first system, a data capture request comprising a plurality of keys and identifying a device in communication with the first system, the plurality of keys comprising a key for each party of a plurality of parties; generate a data capture object comprising a plurality of orchestration rules and a first public key, the first public key corresponding to a first private key; digitally sign the data capture object with a second private key corresponding to a second public key; transmit the data capture object to the first system; receive encrypted user data comprising user data encrypted with the first public key, at least a portion of the user data input from a device; generate a transient token based on the user data and the plurality of orchestration rules; and distribute the transient token to each party of the plurality of parties by transmitting the transient token to the first system via the device, the transient token configured to, based on the plurality of orchestration rules, cause the first system to transmit the transient token to each party of the plurality of parties based on a corresponding key of the plurality of keys.

In non-limiting embodiments or aspects, the first system comprises a merchant system webpage, and the user data is input into a frame or window on the merchant system webpage hosted by a system external to the merchant system webpage. In non-limiting embodiments or aspects, transmitting the transient token to the first system via the device comprises passing the transient token from the device to the first system via a web browser executing on the device. In non-limiting embodiments or aspects, a payment gateway comprises the at least one processor. In non-limiting embodiments or aspects, the data capture request is received via an Application Programming Interface (API). In non-limiting embodiments or aspects, the first system comprises a merchant system, and the plurality of parties comprises a payment processor, the merchant system, and at least one of the following: a fraud service system, a loyalty provider system, an issuer system, an authentication service provider system, or any combination thereof.

According to non-limiting embodiments or aspects, provided is a computer program product comprising at least one non-transitory computer-readable medium including program instructions that, when executed by at least one processor, causes the at least one processor to: receive, from a first system, a data capture request comprising a plurality of keys and identifying a device in communication with the first system, the plurality of keys comprising a key for each party of a plurality of parties; generate a data capture object comprising a plurality of orchestration rules and a first public key, the first public key corresponding to a first private key; digitally sign the data capture object with a second private key corresponding to a second public key; transmit the data capture object to the first system; receive encrypted user data comprising user data encrypted with the first public key, at least a portion of the user data input from a device; generate a transient token based on the user data and the plurality of orchestration rules; and distribute the transient token to each party of the plurality of parties by transmitting the transient token to the first system via the device, the transient token configured to, based on the plurality of orchestration rules, cause the first system to transmit the transient token to each party of the plurality of parties based on a corresponding key of the plurality of keys.

In non-limiting embodiments or aspects, the first system comprises a merchant system webpage, and the user data is input into a frame or window on the merchant system webpage hosted by a system external to the merchant system webpage. In non-limiting embodiments or aspects, transmitting the transient token to the first system via the device comprises passing the transient token from the device to the first system via a web browser executing on the device. In non-limiting embodiments or aspects, a payment gateway comprises the at least one processor. In non-limiting embodiments or aspects, the data capture request is received via an Application Programming Interface (API). In non-limiting embodiments or aspects, the first system comprises a merchant system, and the plurality of parties comprises a payment processor, the merchant system, and at least one of the following: a fraud service system, a loyalty provider system, an issuer system, an authentication service provider system, or any combination thereof. In non-limiting embodiments or aspects, the device comprises a user device, and the encrypted user data is generated by the first system. In non-limiting embodiments or aspects, the device comprises a user device, and the encrypted user data is generated by the first system.

Other non-limiting embodiments or aspects will be set forth in the following numbered clauses:

Clause 1: A computer-implemented method, comprising: receiving, by at least one processor from a first system, a data capture request comprising a plurality of keys and identifying a device in communication with the first system, the plurality of keys comprising a key for each party of a plurality of parties; generating, with the at least one processor, a data capture object comprising a plurality of orchestration rules and a first public key, the first public key corresponding to a first private key; digitally signing, with the at least one processor, the data capture object with a second private key corresponding to a second public key; transmitting, with the at least one processor, the data capture object to the first system; receiving encrypted user data comprising user data encrypted with the first public key, at least a portion of the user data input from a device; generating, with the at least one processor, a transient token based on the user data and the plurality of orchestration rules; and distributing, with the at least one processor, the transient token to each party of the plurality of parties by transmitting the transient token to the first system via the device, the transient token configured to, based on the plurality of orchestration rules, cause the first system to transmit the transient token to each party of the plurality of parties based on a corresponding key of the plurality of keys.

Clause 2: The method of clause 1, wherein the first system comprises a merchant system webpage, and wherein the user data is input into a frame or window on the merchant system webpage hosted by a system external to the merchant system webpage.

Clause 3: The method of clauses 1 or 2, wherein transmitting the transient token to the first system via the device comprises passing the transient token from the device to the first system via a web browser executing on the device.

Clause 4: The method of any of clauses 1-3, wherein a payment gateway comprises the at least one processor.

Clause 5: The method of any of clauses 1-4, wherein the data capture request is received via an Application Programming Interface (API).

Clause 6: The method of any of clauses 1-5, wherein the first system comprises a merchant system, and wherein the plurality of parties comprises a payment processor, the merchant system, and at least one of the following: a fraud service system, a loyalty provider system, an issuer system, an authentication service provider system, or any combination thereof.

Clause 7: A system comprising at least one processor programmed or configured to: receive, from a first system, a data capture request comprising a plurality of keys and identifying a device in communication with the first system, the plurality of keys comprising a key for each party of a plurality of parties; generate a data capture object comprising a plurality of orchestration rules and a first public key, the first public key corresponding to a first private key; digitally sign the data capture object with a second private key corresponding to a second public key; transmit the data capture object to the first system; receive encrypted user data comprising user data encrypted with the first public key, at least a portion of the user data input from a device; generate a transient token based on the user data and the plurality of orchestration rules; and distribute the transient token to each party of the plurality of parties by transmitting the transient token to the first system via the device, the transient token configured to, based on the plurality of orchestration rules, cause the first system to transmit the transient token to each party of the plurality of parties based on a corresponding key of the plurality of keys.

Clause 8: The system of clause 7, wherein the first system comprises a merchant system webpage, and wherein the user data is input into a frame or window on the merchant system webpage hosted by a system external to the merchant system webpage.

Clause 9: The system of clauses 7 or 8, wherein transmitting the transient token to the first system via the device comprises passing the transient token from the device to the first system via a web browser executing on the device.

Clause 10: The system of any of clauses 7-9, wherein a payment gateway comprises the at least one processor.

Clause 11: The system of any of clauses 7-10, wherein the data capture request is received via an Application Programming Interface (API).

Clause 12: The system of any of clauses 7-11, wherein the first system comprises a merchant system, and wherein the plurality of parties comprises a payment processor, the merchant system, and at least one of the following: a fraud service system, a loyalty provider system, an issuer system, an authentication service provider system, or any combination thereof.

Clause 13: A computer program product comprising at least one non-transitory computer-readable medium including program instructions that, when executed by at least one processor, causes the at least one processor to: receive, from a first system, a data capture request comprising a plurality of keys and identifying a device in communication with the first system, the plurality of keys comprising a key for each party of a plurality of parties; generate a data capture object comprising a plurality of orchestration rules and a first public key, the first public key corresponding to a first private key; digitally sign the data capture object with a second private key corresponding to a second public key; transmit the data capture object to the first system; receive encrypted user data comprising user data encrypted with the first public key, at least a portion of the user data input from a device; generate a transient token based on the user data and the plurality of orchestration rules; and distribute the transient token to each party of the plurality of parties by transmitting the transient token to the first system via the device, the transient token configured to, based on the plurality of orchestration rules, cause the first system to transmit the transient token to each party of the plurality of parties based on a corresponding key of the plurality of keys.

Clause 14: The computer program product of clause 13, wherein the first system comprises a merchant system webpage, and wherein the user data is input into a frame or window on the merchant system webpage hosted by a system external to the merchant system webpage.

Clause 15: The computer program product of clauses 13 or 14, wherein transmitting the transient token to the first system via the device comprises passing the transient token from the device to the first system via a web browser executing on the device.

Clause 16: The computer program product of any of clauses 13-15, wherein a payment gateway comprises the at least one processor.

Clause 17: The computer program product of any of clauses 13-16, wherein the data capture request is received via an Application Programming Interface (API).

Clause 18: The computer program product of any of clauses 13-17, wherein the first system comprises a merchant system, and wherein the plurality of parties comprises a payment processor, the merchant system, and at least one of the following: a fraud service system, a loyalty provider system, an issuer system, an authentication service provider system, or any combination thereof.

Clause 19: The computer program product of any of clauses 13-18, wherein the device comprises a user device, and wherein the encrypted user data is generated by the first system.

Clause 20: The method of any of clauses 13-19, wherein the device comprises a user device, and wherein the encrypted user data is generated by the first system.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

Additional advantages and details are explained in greater detail below with reference to the non-limiting, exemplary embodiments that are illustrated in the accompanying schematic figures, in which.

DESCRIPTION OF THE PREFERRED EMBODIMENTS

Figure 1:
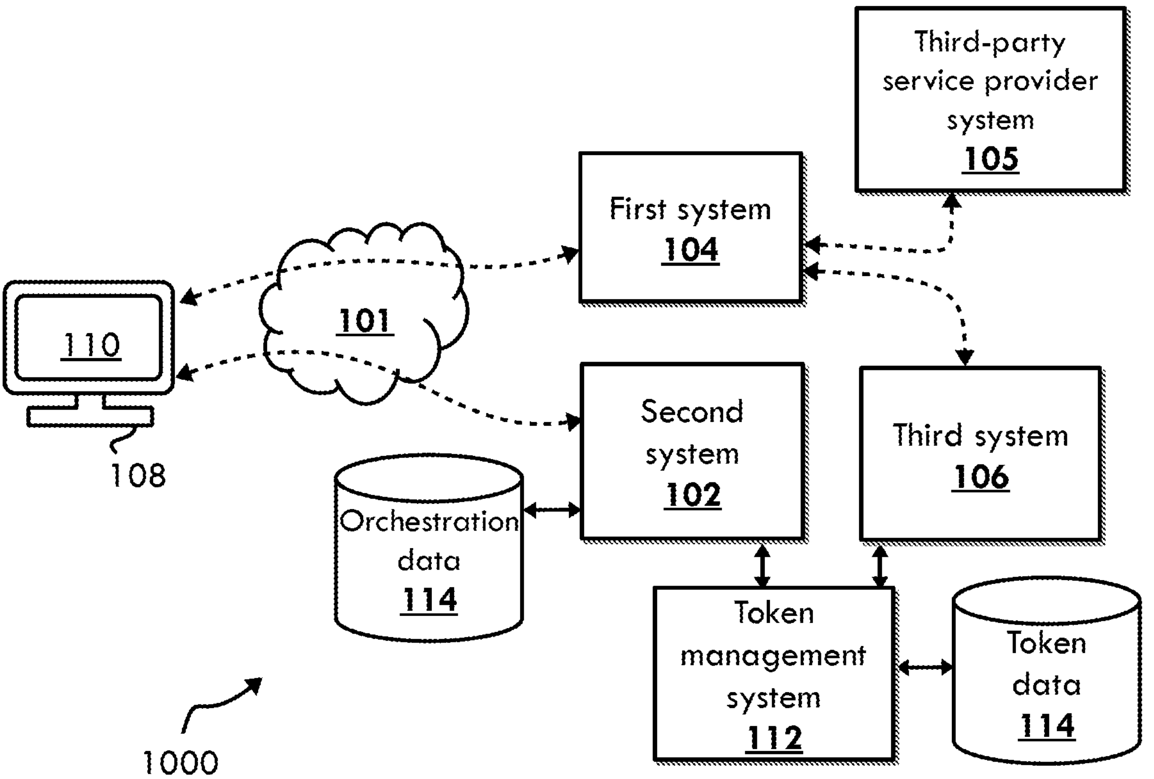
FIG. 1 is a schematic diagram of a system for secure data distribution according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects described herein relate to a system, method, and computer program product for securely distributing data among a plurality of systems. Non-limiting embodiments or aspects described herein improve upon existing transaction systems involving multiple parties (e.g., different systems) by avoiding message replication, improving data integrity, and reducing or eliminating unnecessary or extraneous processes and communications. Non-limiting embodiments or aspects described herein encapsulate secure information from a user, such as payment credentials for a payment transaction, with rules for processing the transaction, thereby facilitating a party involved in the transaction to orchestrate the flow and accessibility of information among multiple different systems.

FIG. 1 depicts a system 1000 for secure data distribution according to a non-limiting embodiments or aspects. The system includes a client computing device 108 which displays a webpage 110. The client computing device 108 may be a client computer, client mobile device, and/or the like. The client computing device 108 is in communication with a first system 104 through a network 101, such as the Internet, and the webpage 110 may be hosted by the first system 104. The client computing device 108 is also in communication with a second system 102, which may be a payment system in some examples such as a payment gateway. The first system 104 may include one or more computing devices running one or more software programs. The first system 104 may be a merchant system, such a merchant web server hosting the webpage 110 by providing web content to the client computing device 108.

With reference to FIG. 1, the second system 102 is in communication with an orchestration database 114 that stores orchestration data. The second system 102 may be one or more computing devices, such as a server computer, providing an orchestration service that may be called (e.g., invoked) by other systems and operate based on the orchestration data. The orchestration data may include, for example, a plurality of orchestration rules registered by various participant systems, such as first system 104. The orchestration rules for first system 104 may include system identifiers for each system that the first system 104 plans to interact with and distribute data to (e.g., third system 106 and third-party service provider system 105). Each system identifier may be associated with one or more orchestration rules. For example, an orchestration rule for a system identifier may include a subset of data parameters (e.g., data elements) that a corresponding system can receive from the first system 104. In this manner, different systems (e.g., third system 106 and third-party service provider system 105) may receive different data from the first system 104. The orchestration rules may be registered by the first system 104 and/or the second system 102. The orchestration rules may also specify the types of services or permissions each participating system has. In some non-limiting embodiments or aspects, the orchestration rules may be a series of logical statements (e.g., such as "if-then" statements) configured as rules to control the flow of data among systems.

In the example shown in FIG. 1, the first system 104 is in communication with a third system 106 and a third-party service provider system 105. The third system 106 and third-party service provider system 105 may each be one or more computing devices, such as a server computer. In some examples, the third system 106 is a transaction processing system configured to process and settle payment transactions in an electronic payment processing network. In some examples, there may be one or more third-party service provider systems 105 is a fraud service system, a loyalty provider system, an issuer system, an authentication service provider system, and/or the like.

Also shown in FIG. 1 is a token management system 112 in communication with the second system 102, third system 106, and token database 114. The token management system 112 may store tokens (e.g., payment tokens corresponding to account identifiers used to make payments) in the token database 114 in association with user data (e.g., account information or the like). In non-limiting embodiments, the token management system 112 may generate a transient token based on the user information and the data from the data capture object. The transient token may be a data structure containing encrypted information from the user and the orchestration rules associated with the first system 104 and/or data capture object. The transient token allows sensitive information to be given by a user without the first system 104 being given direct access to the sensitive information. The transient token allows for a separation between the data capture and the data processing portions of processing a transaction such that the first system 104 (e.g., such as a merchant) is capable of processing a transaction with the transient token without ever storing the sensitive information from the user. The transient token may be replicated on multiple data storage devices and/or servers to achieve high availability.

Systems and methods for generating and processing a transient token are described in U.S. Patent Application Publication No. 2021/0019716 to Prokop et al., which is hereby incorporated by reference in its entirety. Transient tokens may be shared among a group of two or more systems (e.g., first system 104, third system 106, third-party service provider system 105, etc.) such that each system of the group may be authorized to use the transient token in a manner defined by the orchestration rules. For example, the systems may be added to a group based on a system identifier associated with each system that uniquely identifies the merchant.

As an example, a user of the client computing device 108 may access a webpage hosted by the first system 104 and seek to engage in a transaction (e.g., a payment transaction, an authentication process, and/or the like) with the first system 104 or through the first system 104. The webpage may embed a data capture object hosted by the second system 102. The data capture object may be invoked via an Application Programming Interface (API) of the second system 102 (e.g., an orchestration service). The data capture object may include, for example, an application, module, form, webpage, and/or the like configured to receive user data through the client computing device 108. The data capture object may also include one or more parameters to define the context and appearance of a graphical user interface (GUI) displayed to the user on the client computing device 108. The data capture object may be presented to the user of the client computing device 108 through a frame, pop-up window, new tab, and/or the like, which may be prompted by one or more scripts of the webpage provided by the first system 104. The data capture object allows for the second system 102 to capture user input data in a secure manner, without exposing it to the first system 104 or other systems.

In some non-limiting embodiments or aspects, the user data may be provided by the first system 104. For example, in a case in which a user has already registered with the first system 104 (e.g., a customer returning to a merchant), the first system 104 may already have some or all of the user data stored (e.g., an account identifier, billing address, and/or the like). In such an example, the first system 104 may insert one or more parameters of user data to be captured by the data capture object. In some non-limiting embodiments, the client computing device 108 may provide all, a portion of, or none of the user data, and the first system 104 (or another system) may provide all, a portion of, or none of the user data.

Once the second system 102 captures user data via the data capture object, it may generate a transient token based on the user data and the orchestration rules. For example, the transient token may include the data capture object or some portion thereof. Additionally or alternatively, the transient token may be separate from and sent with the data capture object. The second system 102 may generate the transient token by communicating with the token management system 112, which may store the generated token in the token database 114. The transient token may be cryptographically signed with a private key corresponding to a public key associated with the first system 104, as an example. The transient token is transmitted from the second system 102 to the first system 104 via the client computing device 108. For example, the transient token may be first transmitted to the client computing device 108 via the data capture GUI presented by the data capture object, and the client computing device 108 (e.g., a web browser or application executing on the device) may pass the transient token to the first system 104. As an example, a client-side script of a webpage 110 may transmit the transient token to the first system 104 via an ongoing session.

The first system 104, after receiving the transient token, may then distribute the transient token to one or more other systems (e.g., third system 106, third-party service provider system 105, etc.). The distribution of the transient token may occur through one or more APIs hosted by the first system 104 and/or the one or more other systems (e.g., third system 106, third-party service provider system 105, etc.). The distribution may depend upon the transaction being requested. For example, a payment transaction may involve distribution of the transient token to a third system 106 (e.g., a transaction processing system) and a third-party system 105 (e.g., a fraud detection system).

The number and arrangement of systems and devices shown in FIG. 1 are provided as an example. There may be additional systems and/or devices, fewer systems and/or devices, different systems and/or devices, and/or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of the system 1000 may perform one or more functions described as being performed by another set of systems or another set of devices of the system 1000.

Figure 2:
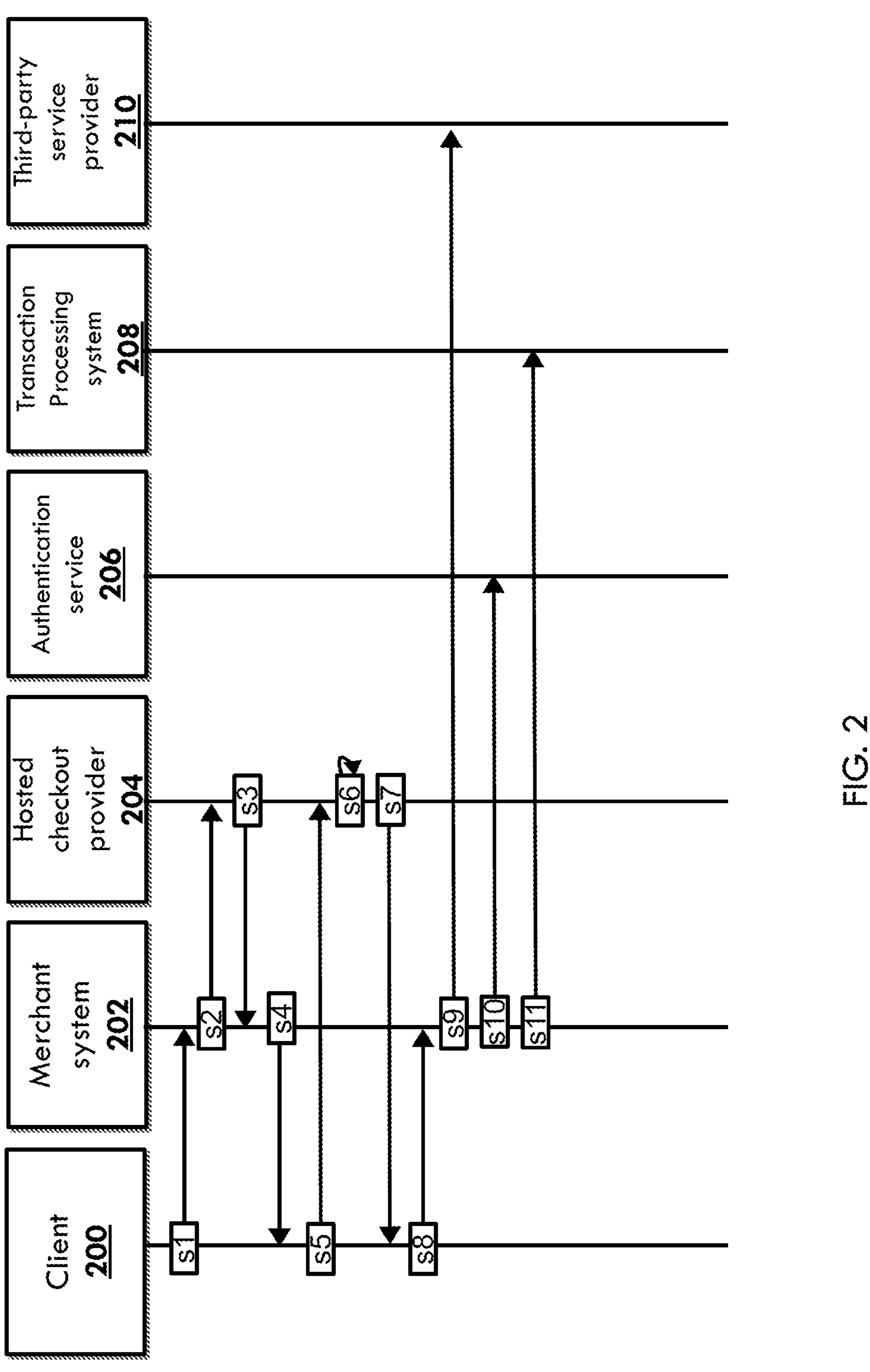
FIG. 2 is a sequence diagram for a method of secure data distribution according to some non-limiting embodiments or aspects.

Referring now to FIG. 2, a sequence diagram for a secure data distribution system and method is shown according to non-limiting embodiments or aspects. The example shown in FIG. 2 involves a payment transaction for a web-based checkout process, although it will be appreciated that the systems and methods described herein may be used for various different types of transactions, including non-payment transactions, and that various other arrangements and participating systems are possible in non-payment transaction and payment transaction scenarios.

At step s1 of FIG. 2, a user of a client computing device 200 accesses a merchant webpage or application hosted by a merchant system 202. In response to the user choosing to engage in a transaction (e.g., checkout), the merchant system 202, via the merchant webpage or application, may generate and transmit an API call to an API exposed by a hosted checkout provider 204 at step s2. The hosted checkout provider 204 may be independent of the merchant system 202. The API call transmitted by the merchant system 202 may include user data collected from the webpage or application and may be authenticated with one or more cryptographic functions. As part of the API call, the merchant system 202 may provide asymmetric key values for all of the systems (e.g., parties) it wishes to distribute data to, along with data about the types of services of each system and what orchestration rules apply to which systems. For example, various system identifiers may be associated with public/private key pairs. Additionally or alternatively to an API call, any other type of network-based messaging may be used to communicate data.

At step s3, the hosted checkout provider 204 generates and transmits to the merchant system 202 a data capture object (e.g., including a "capture context") based on the information. The data capture object may be digitally signed by the hosted checkout provider 204 with, for example, a private key of a public/private key pair. In some examples, the private key may be a long-living secret key possessed by the hosted checkout provider 204 and corresponding to a public key that is publicized and known by the participating systems (e.g., the merchant system 202, an authentication service 206, a transaction processing system 208, a third-party service provider 210, etc.). The data capture object may be transmitted to the merchant system 202 as a digitally signed JavaScript Object Notation (JSON) Web Token (JWT). The data capture object may include the one or more orchestration rules associated with each identified participant system.

At step s4, the merchant system 202 transmits the data capture object to the client computing device 200 via the merchant webpage or application. The client computing device 200 (e.g., a web browser or application) may verify the authenticity of the data capture object based on the public key corresponding to the long-living secret key possessed by the hosted checkout provider 204. The data capture object may be, for example, embedded in the merchant webpage or application and/or referenced from the code of the merchant webpage or application so as to present a pop-up window, tab, frame, and/or the like on the client computing device 200. In non-limiting embodiments or aspects, the data capture object may be used to initiate execution of a web-based application, native program code, and/or a client-side native application to capture payment information from the user.

At step s5, the client computing device 200 may encrypt and transmit inputted payment information. The user inputs payment information by entering payment credentials (e.g., account identifier), authorizing an electronic wallet, and/or authenticating with a payment provider (e.g., Apple Pay®, PayPal®, Klarna.®, and/or the like) using the data capture object. The client computing device 200 may encrypt the payment information with a public key included in the data capture object. The encrypted payment information is then transmitted to a destination specified by the data capture object (e.g., a network address included in the data capture object), which is the hosted checkout provider 204 in the example shown in FIG. 2. The data capture object or a portion thereof may also be transmitted to the hosted check-out provider 204.

At step s6, a transient token is generated based on the data capture object and the payment information. Although FIG. 2 shows step s6 being performed by the hosted checkout provider 204, this may also be performed by a token management system (not shown in FIG. 2) or another system. The token management system may be part of the hosted checkout provider 204, part of the transaction processing system 208, or may be a separate system. The transient token may be generated based on the orchestration data in the data capture object. For example, one or more orchestration rules may specify one or more parameters for the transient token, such as data field types, data structure types, and/or the like. For example, the transient token may include a token identifier and one or more parameters of payment information, and one or more other parameters of the payment information (e.g., sensitive information, such as a Card Verification Value (CVV)) may be excluded from the transient token and stored in a token database (e.g., a token vault) to be securely accessed by the transaction processing system 208 at the end of the transaction process. Other payment information, such as an account identifier, address, and/or the like, may be compartmentalized and provided in masked, encrypted, and/or digitally signed format within the transient token. The transient token may be a JWT, as an example. The transient token, after being generated, may be encrypted one or more times with public keys belonging to each participating system (e.g., merchant system 202, authentication service 204, transaction processing system 208, and/or third-party service provider 210). The transient token may include the data capture object or a portion thereof.

At steps s7 and s8, the transient token is transmitted to the merchant system 202 via the client computing device 200. For example, at step s7 the transient token may be first transmitted to the client computing device 200 via the data capture GUI presented by the data capture object (e.g., through an open session initiated in a web browser or application on the client computing device 200), and at step s8 the client computing device 200 (e.g., a web browser or application executing on the device) may pass the transient token to the merchant system 202.

Once the merchant system 202 receives the transient token at step s8, the merchant system 202 may then process the orchestration data to distribute the transient token to the other participating systems (e.g., authentication service 204, transaction processing system 208, and/or third-party service provider 210). For example, at step s9 the merchant system 202 may transmit the transient token to third-party service provider 210, which may be a tax calculation service, fraud detection service, a 3D Secure service, and/or the like. Those systems may use the information in the transient token to perform one or more services and return the resulting output to the merchant system 202. For example, the third-party service provider 210 may decrypt the transient token or portion thereof with a private key corresponding to a public key used to generate and/or encrypt the transient token. This decryption may provide the third-party service provider 210 with the subset of information (e.g., transaction amount, location, and category) used to render the services (e.g., determine tax information or the like). In some examples, the other participating systems may produce or cause the production of additional transient tokens that supersede the original transient token and are used for downstream communication.

After the merchant system 200 determines that it would like to proceed with the transaction after communicating with the third-party service provider 210 and/or other participating systems, the merchant system 200 may communicate the transient token to the authentication service 206 at step s10 and the transaction processing system 208 at step s11. The authentication service 206 and/or transaction processing system 208 may decrypt the transient token to obtain payment information. The authentication service 206 and/or transaction processing system 208 may also use the transient token to retrieve sensitive data from the token vault from the token management system and use this sensitive data (e.g., a CVV value or the like) in combination with other payment information received directly from the merchant system 202 and/or from the transient token.

In some non-limiting embodiments, a system may act as an intermediary to provide user data, or other associated data, into the data flow. For example, in one possible scenario, a user may sign up for a bank's payment device (e.g., a credit card) during a checkout process on a merchant's website (e.g., first system 104). After the user opts to apply for a bank payment device as part of a check-out process, the merchant system (e.g., first system 104) may set up the data capture object for the transaction by calling an orchestration service (e.g., second system 102) using a pre-established authentication method. The orchestration service (e.g., second system 102), in response, creates the data capture object with public keys belonging to itself (e.g., second system 102), the bank (e.g., third system 106), and a third-party credit checking service (e.g., third-party service provider system 105), and may sign the data capture object with a private key unique to the orchestration service (e.g., second system 102).

With continued reference to the example of a user signing up for a payment device during checkout, once the user is presented with the data capture object on the client computing device 108, they may enter personal data and credit check data, without payment information, on the merchant website (merchant system) (e.g., first system 104). In an example in which the user is already registered with the merchant system (e.g., first system 104), the merchant system may provide user data that is already stored local to the merchant system and may not require the user to enter all or any of the information. The user data is then encrypted with the public keys based on the data capture object (e.g., address data may be encrypted with the bank's public key, and all of the data may be encrypted together with a public key for the third-party credit checking service). The user data may be encrypted by the client computing device 108 or the first system 104 in examples in which the first system 104 provides some or all of the user data. This encrypted data is then communicated to the bank (e.g., third system 106) pursuant to the rules specified by the data capture object, and the bank verifies the validity of the data using the keys injected into the data capture object by the orchestration service (e.g., second system 102). The bank then communicates the data to the third-party service provider system 105, which decrypts at least a portion of the encrypted data using its key(s), performs a credit check, and communicates the results of the credit check to the bank. The credit check results may be encrypted using a public key of the bank (as included in the data capture object) and signed by the private key of the third-party service provider system 105.

With continued reference to the example of a user signing up for a payment device during checkout, the bank (e.g., third system 106) may validate the credit check results upon receiving it from the third-party service provider system 105 (and decrypting it if it was encrypted). If the bank approves and successfully validates the credit check results, it may then issue a new payment device (e.g., a new PAN), encrypt this account identifier using the public key of the orchestration service (e.g., second system 102), and communicate the encrypted data to the orchestration device. The data capture object may include the public key of the orchestration service to enable this. The orchestration service (e.g., second system 102) may then create a transient token and communicate the transient token to the merchant system (e.g., first system 104). The merchant system may then capture the final approval from the user for the transaction (e.g., a selectable option to complete purchase) and, in response to receiving final approval, may generate and communicate an authorization request message that includes the transient token to the orchestration service. It will be appreciated that various intermediary systems may be involved prior to or after the authorization request message is generated, including fraud systems, 3D-Secure (3DS) directory service providers, and/or the like. These systems may, in some examples, provide data (e.g., a portion of the user data) for the capture context.

In some non-limiting embodiments or aspects, the transient token may be evicted in response to successful processing (e.g., after the services are performed) or may be kept as a persistent token for future processing. Further, at any of steps s1-s11, digital signatures may be used to digitally sign the communicated data (e.g., encode the data with a private key) and verify the communicated data (e.g., with a corresponding public key) to ensure data integrity and prevent tampering. The various keys may be included in the transient token and/or part of the data capture object.

The data packets and messages used to request the data capture object and/or communicate the transient token and/or orchestration details may be in various structures. For example, a merchant system may send a message to the hosted checkout provider to request Unified Checkout by including a target address (e.g., a URL), a client version or identifier (e.g., identifying a web browser or application used by the client computing device), allowed payment networks (e.g., Visa®, etc.), allowed payment types (e.g., entry of a PAN, Secure Remote Commerce (SRC) (click to pay) payment, PayPal®, etc.), and encryption keys. As an example, a first encryption key may be used to encrypt a shipping address to provide to the merchant system for shipping, and a second encryption key may be used to encrypt a shipping address or other information for a third-party processor. By including multiple different keys, personal information necessary to fill the order is provided to the merchant (e.g., full shipping address), and part of the shipping address (e.g., city/state) may be provided to facilitate orchestration of a tax calculation service that uses the shipping destination. It will be appreciated that different subsets of data may be performed to different systems and may be differently encrypted with corresponding keys. The keys may be symmetric encryption keys or asymmetric encryption keys. If asymmetric keys are used, the public keys may be provided in the data capture object and/or transient token. In some examples, the keys may be part of an encrypted portion of the transient token and/or data capture object. By providing encryption keys for different elements and subsets of elements of the transient token, the merchant can control what elements to keep opaque while in transit via an untrusted device or network.

In non-limiting embodiments or aspects, merchant systems may have permission via the orchestration rules to receive the customer's shipping address, a hosted checkout provider may have permission via the orchestration rules to receive payment and address details, an authenticating system (such as an Access Control Server (ACS) in a 3D Secure scenario) may have permission via the orchestration rules to receive an account identifier and billing address, but not the CVV/CVV2 security code, and a transaction processing system or other payment provider may have permission via the orchestration rules to receive all of the transaction data and to invoke one or more third-party services (e.g., the orchestration rules may specify that the payment provider performs a risk assessment and only approves a transaction that is low risk, or the like). It will be appreciated that the orchestration rules may provide different data elements and permissions to different participating systems depending on the type of transaction being conducted and other considerations.

In non-limiting embodiments or aspects, the merchant may provide a public key (in some examples a one-time use key) when requesting the data capture object to permit the hosted checkout provider or another system to encrypted personally identifying information (e.g., billing and shipping address). The hosted checkout provider or another system may still return unencrypted opaque data (e.g., masked) in a content element (e.g., field or fields) of the transient token.

In non-limiting embodiments or aspects, the merchant may provide a public key for a third-party payment processor to allow the hosted checkout provider to encrypt payment information captured by Unified Checkout. In this manner, data may flow from an end application (e.g., such as a widget like SRC or any other application) to the web browser, from the web browser to the API of the hosted checkout provider, then a transient token is added and sent back to the web browser, then the web browser passes the data to the merchant system, and then the merchant system transmits the data to the third-party payment processor.

In non-limiting embodiments or aspects, the keys provided by the merchant system may be referenced to keys escrowed by a key management module associated with the hosted checkout provider and/or other system.

Generating the data capture object may include, as an example, building an array of JSON objects. In some examples, the orchestration rules and/or other aspects of the data capture object may be in a Domain-Specific Language (DSL). In some non-limiting embodiments or aspects, a payment gateway may control the flow of data by secure code based on DSL or the like, which may allow for the merchant system to retain a high level of compliance (e.g., a Payment Card Industry (PCI) Self-Assessment Questionnaire (PCI SAQ) A-level) because the merchant code (e.g., merchant webpage or server) does not control the orchestration and flow of data (the merchant outsources all responsibility to a third party). Since the data capture object is signed using one or more private keys, any modification of the data object may be detected using the corresponding public key, which is known and/or publicly available.

When the second system 102 receives the data capture object, the second system 102 may execute an API mapper based on the captured data to create the transient token. A sensitive payload (e.g., encrypted portion) may be inserted into the transient token, and the data capture object may specify which data elements are part of the encrypted portion. For example a Bank Identification Number (BIN) and account expiration date may be provided in plain text to facilitate 3D-Secure (3DS) authentication, but could also be encrypted with one or more keys.

Figure 3:
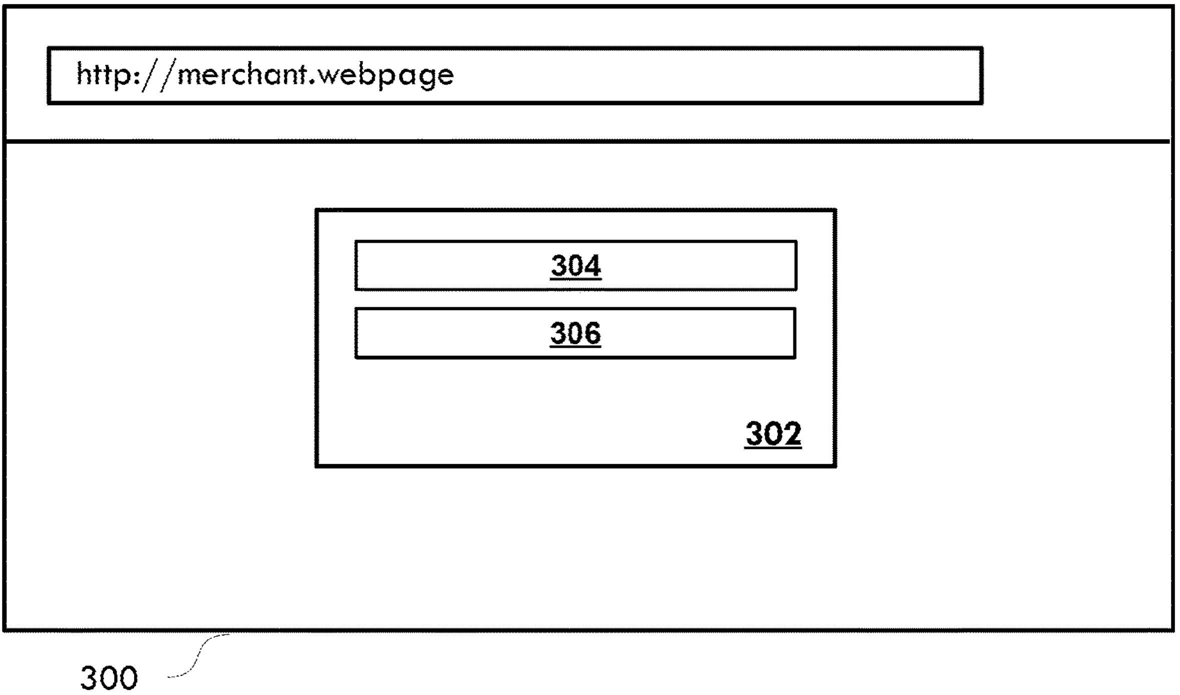
FIG. 3 is a graphical user interface (GUI) of a merchant webpage with data capture object according to some non-limiting embodiments or aspects.

Referring now to FIG. 3, a webpage 300 is shown according to some non-limiting embodiments or aspects. The webpage 300 may be presented by the first system 104 in FIG. 1 or the merchant system 202 in FIG. 2, as examples. The webpage includes a hosted data capture page 302 embedded in the webpage 300, such that the hosted data capture page 302 is provided by a different system (e.g., the second system 102 in FIG. 1 or the hosted checkout provider 204 in FIG. 2). In this manner, information inputted by a user on a client computing device into fields 304, 306, such as an account identifier, expiration date, billing address, CVV value, and/or the like, is not exposed to the host of the webpage 300, but instead provided directly to the other system (e.g., the second system 102 in FIG. 1 or the hosted checkout provider 204 in FIG. 2). It will be appreciated that various other GUIs may be used, and that they may be presented through a web browser as in FIG. 3 or through a mobile application, desktop application, client operating system, and/or the like.

Although some non-limiting embodiments or aspects described herein relate to payment transactions in an electronic payment processing network, it will be appreciated that the systems and methods described herein may be applied to other types of transactions involving multiple parties.

Figure 4:
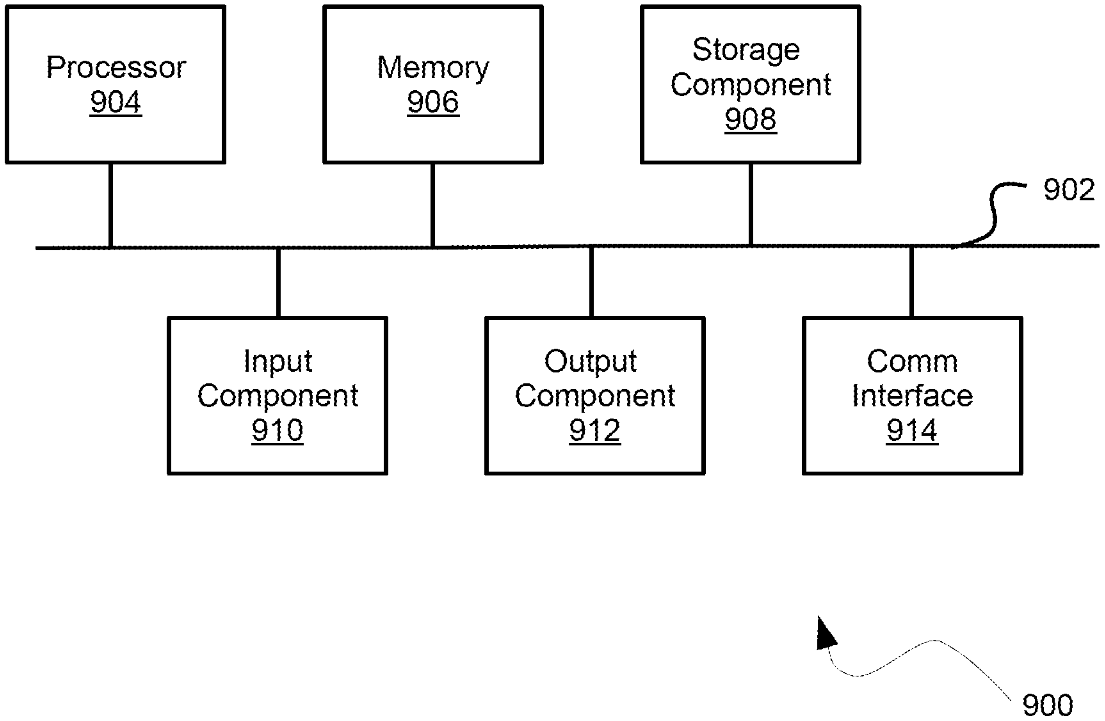
FIG. 4 illustrates example components of a device used in connection with non-limiting embodiments or aspects.

Referring now to FIG. 4, shown is a diagram of example components of a device 900 according to non-limiting embodiments or aspects. Device 900 may correspond to the first system 104, second system 102, third system 106, third-party service provider 105, token management system 112, and/or client computing device 108 in FIG. 1, as an example. In some non-limiting embodiments or aspects, such systems or devices may include at least one device 900 and/or at least one component of device 900. The number and arrangement of components shown are provided as an example. In some non-limiting embodiments or aspects, device 900 may include additional components, fewer components, different components, or differently arranged components than those shown in FIG. 4. Additionally, or alternatively, a set of components (e.g., one or more components) of device 900 may perform one or more functions described as being performed by another set of components of device 900.

As shown in FIG. 4, device 900 may include a bus 902, a processor 904, memory 906, a storage component 908, an input component 910, an output component 912, and a communication interface 914. Bus 902 may include a component that permits communication among the components of device 900. In some non-limiting embodiments or aspects, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 4, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed to" and/or "configured to," as used herein, may refer to an arrangement of software, device(s), and/or hardware for performing and/or enabling one or more functions (e.g., actions, processes, steps of a process, and/or the like). For example, "a processor programmed or configured to" may refer to a processor that executes software instructions (e.g., program code) that cause the processor to perform one or more functions.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

The invention claimed is:

1. A computer-implemented method, comprising:

receiving, by at least one processor from a first system, a data capture request comprising a plurality of keys and identifying a device in communication with the first system, the plurality of keys comprising a key for each party of a plurality of parties;

generating, with the at least one processor, a data capture object comprising a plurality of orchestration rules and a first public key, the first public key corresponding to a first private key;

digitally signing, with the at least one processor, the data capture object with a second private key corresponding to a second public key;

transmitting, with the at least one processor, the data capture object to the first system;

receiving encrypted user data comprising user data encrypted with the first public key, at least a portion of the user data input from a device;

generating, with the at least one processor, a transient token based on the user data and the plurality of orchestration rules; and distributing, with the at least one processor, the transient token to each party of the plurality of parties by transmitting the transient token to the first system via the device, the transient token configured to, based on the plurality of orchestration rules, cause the first system to transmit the transient token to each party of the plurality of parties based on a corresponding key of the plurality of keys.

2. The method of claim 1, wherein the first system comprises a merchant system webpage, and wherein the user data is input into a frame or window on the merchant system webpage hosted by a system external to the merchant system webpage.

3. The method of claim 1, wherein transmitting the transient token to the first system via the device comprises passing the transient token from the device to the first system via a web browser executing on the device.

4. The method of claim 1, wherein a payment gateway comprises the at least one processor.

5. The method of claim 1, wherein the data capture request is received via an Application Programming Interface (API).

6. The method of claim 1, wherein the first system comprises a merchant system, and wherein the plurality of parties comprises a payment processor, the merchant system, and at least one of the following: a fraud service system, a loyalty provider system, an issuer system, an authentication service provider system, or any combination thereof.

7. The method of claim 1, wherein the device comprises a user device, and wherein the encrypted user data is generated by the first system.

8. A system comprising at least one processor programmed or configured to:

receive, from a first system, a data capture request comprising a plurality of keys and identifying a device in communication with the first system, the plurality of keys comprising a key for each party of a plurality of parties;

generate a data capture object comprising a plurality of orchestration rules and a first public key, the first public key corresponding to a first private key;

digitally sign the data capture object with a second private key corresponding to a second public key;

transmit the data capture object to the first system;

receive encrypted user data comprising user data encrypted with the first public key, at least a portion of the user data input from a device;

generate a transient token based on the user data and the plurality of orchestration rules; and distribute the transient token to each party of the plurality of parties by transmitting the transient token to the first system via the device, the transient token configured to, based on the plurality of orchestration rules, cause the first system to transmit the transient token to each party of the plurality of parties based on a corresponding key of the plurality of keys.

9. The system of claim 8, wherein the first system comprises a merchant system webpage, and wherein the user data is input into a frame or window on the merchant system webpage hosted by a system external to the merchant system webpage.

10. The system of claim 8, wherein transmitting the transient token to the first system via the device comprises passing the transient token from the device to the first system via a web browser executing on the device.

11. The system of claim 8, wherein a payment gateway comprises the at least one processor.

12. The system of claim 8, wherein the data capture request is received via an Application Programming Interface (API).

13. The system of claim 8, wherein the first system comprises a merchant system, and wherein the plurality of parties comprises a payment processor, the merchant system, and at least one of the following: a fraud service system, a loyalty provider system, an issuer system, an authentication service provider system, or any combination thereof.

14. A computer program product comprising at least one non-transitory computer-readable medium including program instructions that, when executed by at least one processor, causes the at least one processor to:

receive, from a first system, a data capture request comprising a plurality of keys and identifying a device in communication with the first system, the plurality of keys comprising a key for each party of a plurality of parties;

generate a data capture object comprising a plurality of orchestration rules and a first public key, the first public key corresponding to a first private key;

digitally sign the data capture object with a second private key corresponding to a second public key;

transmit the data capture object to the first system;

receive encrypted user data comprising user data encrypted with the first public key, at least a portion of the user data input from a device;

generate a transient token based on the user data and the plurality of orchestration rules; and distribute the transient token to each party of the plurality of parties by transmitting the transient token to the first system via the device, the transient token configured to, based on the plurality of orchestration rules, cause the first system to transmit the transient token to each party of the plurality of parties based on a corresponding key of the plurality of keys.

15. The computer program product of claim 14, wherein the first system comprises a merchant system webpage, and wherein the user data is input into a frame or window on the merchant system webpage hosted by a system external to the merchant system webpage.

16. The computer program product of claim 14, wherein transmitting the transient token to the first system via the device comprises passing the transient token from the device to the first system via a web browser executing on the device.

17. The computer program product of claim 14, wherein a payment gateway comprises the at least one processor.

18. The computer program product of claim 14, wherein the data capture request is received via an Application Programming Interface (API).

19. The computer program product of claim 14, wherein the first system comprises a merchant system, and wherein the plurality of parties comprises a payment processor, the merchant system, and at least one of the following: a fraud service system, a loyalty provider system, an issuer system, an authentication service provider system, or any combination thereof.

20. The computer program product of claim 14, wherein the device comprises a user device, and wherein the encrypted user data is generated by the first system.

* * * * *